US008432409B1

(12) United States Patent
Dunlap et al.

(10) Patent No.: US 8,432,409 B1
(45) Date of Patent: Apr. 30, 2013

(54) STRIDED BLOCK TRANSFER INSTRUCTION

(75) Inventors: Frederick S. Dunlap, Longmont, CO (US); Mark A. Krom, Longmont, CO (US); Adam Snay, Longmont, CO (US)

(73) Assignee: Globalfoundries Inc.

( * ) Notice: Subject to any disclaimer, the term of this patent is extended or adjusted under 35 U.S.C. 154(b) by 2098 days.

(21) Appl. No.: 11/317,593

(22) Filed: Dec. 23, 2005

(51) Int. Cl.
*G09G 5/37* (2006.01)
*G06F 13/00* (2006.01)

(52) U.S. Cl.
USPC .......................... 345/562; 345/537; 345/561

(58) Field of Classification Search ............... 345/537, 345/538, 559, 561, 562, 566
See application file for complete search history.

(56) References Cited

U.S. PATENT DOCUMENTS

| | | | |
|---|---|---|---|
| 5,045,967 A * | 9/1991 | Igarashi ..................... 345/589 |
| 5,315,698 A * | 5/1994 | Case et al. .................. 345/522 |
| 6,026,239 A * | 2/2000 | Patrick et al. ............... 717/154 |
| 6,185,629 B1 * | 2/2001 | Simpson et al. ............. 710/10 |
| 6,253,287 B1 * | 6/2001 | Green ......................... 711/125 |
| 6,344,856 B1 * | 2/2002 | Lum et al. ................... 345/562 |
| 6,801,988 B2 | 10/2004 | Nagayasu | |
| 2005/0172049 A1 | 8/2005 | Kamei et al. | |
| 2005/0264589 A1 * | 12/2005 | Kimoto et al. .............. 345/698 |
| 2006/0061827 A1 | 3/2006 | Moss et al. | |
| 2007/0008323 A1 | 1/2007 | Zhou | |
| 2007/0013704 A1 | 1/2007 | MacWilliams et al. | |

OTHER PUBLICATIONS

Simon; Microsoft Windows 2000 API SuperBible; Sep. 13, 2000; Sams; Beginning of chapter 13.*
Neveln; Linux Assembly Language Programming; Jul. 20, 2000; Prentice Hall; Section 3.10.*
Actions on the Merits by the U.S.P.T.O. as of May 20, 2008, 1 page.

* cited by examiner

Primary Examiner — David T Welch

(57) ABSTRACT

A computer readable medium embodies a set of instructions. The set of instructions includes an instruction to manipulate a processor to determine a first value representative of a source memory location of a source storage component, a second value representative of a destination memory location of a destination storage component, a third value representative of a number of lines of a data block to be transferred from the source storage component to the destination storage component, a fourth value representative of a number of bytes to be transferred per line of the data block, a fifth value representative of a byte width of the source storage component and a sixth value representative of a byte width of the destination storage component. The instruction further is to transfer a data block from the source storage component to the destination storage component based on the first, second, third, fourth, fifth and sixth values.

20 Claims, 5 Drawing Sheets

STRIDED BLOCK TRANSFER INSTRUCTION

CO-PENDING APPLICATION

The present disclosure is related to non-provisional U.S. patent application Ser. No. 11/321,706, filed on Dec. 29, 2005, and entitled "DATA BLOCK TRANSFER TO CACHE".

FIELD OF THE DISCLOSURE

The present disclosure relates generally to processing data and more particularly to transferring data between storage components of a processing device.

BACKGROUND

Conventional graphics processing typically involves the transfer of rectangular blocks of image data from a source memory to a destination memory while preparing the image data for display. These block transfers, also referred to as BLTs, typically result in the transfer of data from system memory or a cache to video memory as part of the rasterization process. However, graphics hardware typically does not have access to the translation lookaside buffers (TLBs) and page tables necessary to translate virtual addresses to physical addresses for use in accessing the image data from the system memory. Accordingly, the task of performing BLTs typically is assigned to a central processing unit (CPU) that has ready access to the TLBs and page tables. In conventional systems, the CPU utilizes a software loop to access each line of the source memory and then transfer the data at the accessed line to the corresponding line of the destination memory. Due to this software loop, block transfers typically present a significant burden for the CPU. Moreover, in many instances, the source memory and the destination memory may have different pitches, or widths, that result in a misalignment of the transferred block. Accordingly, an improved technique for performing block transfers would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

Figure 1:
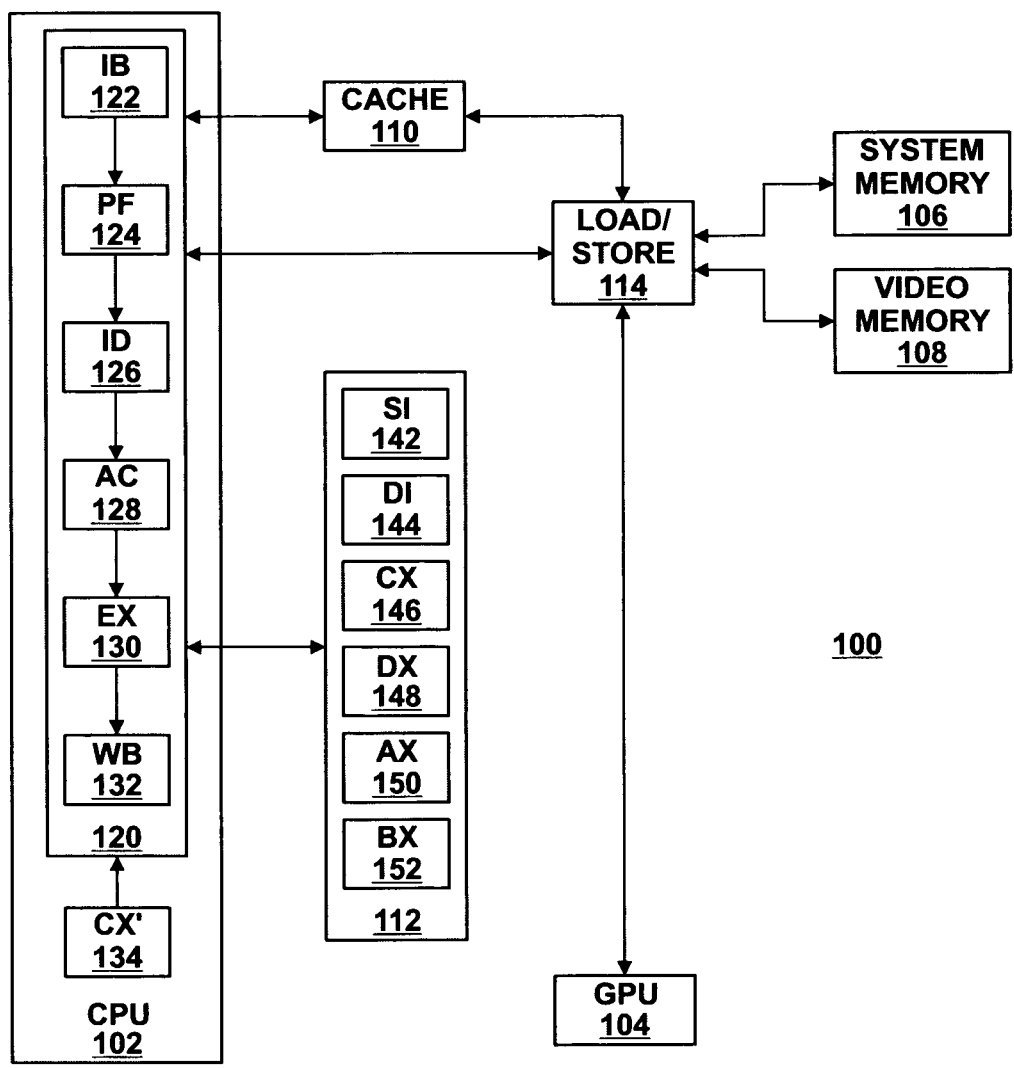
FIG. 1 is a block diagram illustrating an exemplary processing system utilizing strided block transfers and block prefetches in accordance with at least one embodiment of the present disclosure.

The following description is intended to convey a thorough understanding of the present disclosure by providing a number of specific embodiments and details involving block transfers of image data or other types of data. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

In accordance with one embodiment of the present disclosure, a method includes receiving, at an execution pipeline of a processing system, a block data transfer instruction. The method further includes determining, in response to receiving the block data transfer instruction, a first value representative of a source memory location of a source storage component, a second value representative of a destination memory location of a destination storage component, a third value representative of a number of lines of a data block to be transferred from the source storage component to the destination storage component, a fourth value representative of a number of bytes to be transferred per line of the data block, a fifth value representative of a byte width of the source storage component and a sixth value representative of a byte width of the destination storage component. The method additionally includes executing, at the execution pipeline, the block data transfer instruction to transfer the data block from the source storage component to the destination storage component based on the first, second, third, fourth, fifth and sixth values.

In accordance with another embodiment of the present disclosure, a processing system includes a first storage component, a second storage component, and a processing unit coupled to the first and second storage components. The processing unit includes an execution pipeline to receive a block data transfer instruction and determine, in response to receiving the block data transfer instruction, a first value representative of a source memory location of a first storage component, a second value representative of a destination memory location of a second storage component, a third value representative of a number of lines of a data block to be transferred from the first storage component to the second storage component, a fourth value representative of a number of bytes to be transferred per line of the data block, a fifth value representative of a byte width of the first storage component and a sixth value representative of a byte width of the second storage component. The execution pipeline further is to execute the block data transfer instruction to transfer the data block from the first storage component to the second storage component based on the first, second, third, fourth, fifth and sixth values.

In accordance with yet another embodiment of the present disclosure, a computer readable medium embodies a set of instructions. The set of instructions includes an instruction to manipulate a processor to determine a first value representative of a source memory location of a source storage component, a second value representative of a destination memory location of a destination storage component, a third value representative of a number of lines of a data block to be transferred from the source storage component to the destination storage component, a fourth value representative of a number of bytes to be transferred per line of the data block, a fifth value representative of a byte width of the source storage component and a sixth value representative of a byte width of the destination storage component. The instruction further is to transfer a data block from the source storage component to the destination storage component based on the first, second, third, fourth, fifth and sixth values.

Referring to FIG. 1, an exemplary processing system 100 implementing block transfer techniques is illustrated in accordance with at least one embodiment of the present disclosure. The system 100 includes a central processing unit (CPU) 102, a graphics processing unit (GPU) 104, a system memory 106, a video memory 108, a cache 110 (e.g., a level 1 cache), a register file 112, and a load/store unit 114. In the illustrated example, the CPU 102 includes an execution pipeline 120 including an instruction buffer (IB) 122, a prefetch (PF) unit 124, an instruction decode (ID) unit 126, an address calculation (AC) unit 128, an execution (EX) unit 130, and a writeback (WB) unit 132. The CPU 102 also includes an internal CX' register 134. The register file 112 includes a plurality of registers, including SI register 142, DI register 144, CX register 146, DX register 148, AX register 150 and BX register 152.

In operation, the execution pipeline 120 of the CPU 102 processes instructions stored in the cache 110 and buffered in the instruction buffer 122. The execution of instructions can include instruction decoding by the instruction decode unit 126, address calculation by the address calculation unit 128, execution by the execution unit 130 and writeback operations by the writeback unit 132. Further, data utilized in processing an instruction can be prefetched from memory 106 to the cache 110 by the prefetch unit 124 via the load/store unit 114. Further, the GPU 104 processes image data for display, where the image data can be provided via the CPU 102 or another component of the system 100.

In at least one embodiment, processing of image data by the system 100 involves the transfer of blocks of image data between memory 106, the cache 110, and the video memory 108. To illustrate, as part of the rasterization process, the system 100 may transfer image data blocks from the system memory 106 to the video memory 108. Alternately, to perform one or more graphics operations, the GPU 104 may transfer image data blocks from the system memory 106 to the cache 110. In other instances, image data blocks may be transferred from the video memory 108 to the system memory 106.

As with conventional systems, the system 100 may be implemented so that the CPU 102 has ready access to translation lookaside buffers (TLBs) and page tables needed to translate virtual addresses to physical addresses in instances where the memory 106 is a paged memory, whereas the GPU 104 may not have ready access to the TLBs and page tables. Thus, in this instance, the CPU 102 is utilized to handle the block transfer of image data between memory 106 and memory 108. Accordingly, to improve the efficiency of the CPU 102 while performing these block transfers, the CPU 102, in one embodiment, is configured to support execution of a strided block transfer instruction that is capable of manipulating the CPU 102 to transfer a data block between memory 106 and memory 108 in a single execution of the instruction. In certain embodiments, the CPU 102 may be based on the x86 processor architecture, so for ease of reference, the strided block transfer instruction is also referred to herein as the REP MOVSTD instruction based on typical x86 parlance.

The strided block transfer instruction is associated with a number of values utilized in executing the instruction. These values include: a source memory location value identifying a storage location of the source storage component that stores the next data portion to be transferred; a destination memory location value identifying a storage location of the destination storage component that into store the next data portion to be transferred; a line number value identifying the number of lines of the data block to be transferred; a byte number value identifying the number of bytes per line to be transferred; a source pitch value identifying the width of the source storage component (i.e., the number of bytes between the beginning of a line of the source storage component and the beginning of the subsequent line of the source storage component); and a destination pitch value identifying the width of the destination storage component (i.e., the number of bytes between the beginning of a line of the destination storage component and the beginning of the subsequent line of the destination storage component). These values may be provided as instruction constants or may be identified by the instruction via reference to one or more registers associated with the instruction. To illustrate, the registers of the register file 112 may be used to store some or all of these values. In the following description, it is assumed that: the SI register 142 stores the source memory location value; the DI register 144 stores the destination memory location value; the CX register 146 stores the byte number value; the DX register 148 stores the line number value; the AX register 150 stores the source pitch value; and the BX register 152 stores the destination pitch value. The CX' register 134 internal to the CPU 102 is used to store the byte number value in the CX register 146 before any modification of the byte number value has occurred.

Upon receipt at the CPU 102, a strided block transfer instruction is processed by the prefetch unit 124, the instruction decode 126, the address calculation unit 128 and then provided to the execution unit 130 for execution so as to transfer the identified rectangular data block from the identified source memory to the identified destination memory during a single execution of the instruction. As part of this execution, the execution unit 130 may access the values stored in the registers 142-152. An exemplary technique for executing the strided block transfer instruction using the supplied values is described in greater detail herein with reference to FIGS. 2 and 3.

In addition to implementing a strided data block instruction to transfer rectangular data blocks between storage components, in one embodiment, the CPU 102 may implement a strided block transfer of image data from memory to the cache 110 using, for example, the prefetch unit 124. As with a memory-to-memory data block transfer, the CPU 102 may implement the memory-to-cache block transfer using a single instruction. Alternately, in another embodiment, the prefetch unit 124 or other component of the CPU 102 utilizes a prefetch loop to transfer the data block to the cache. An exemplary technique for a block transfer to the cache 110 is described in greater detail herein with reference to FIGS. 4 and 5.

Figure 2:
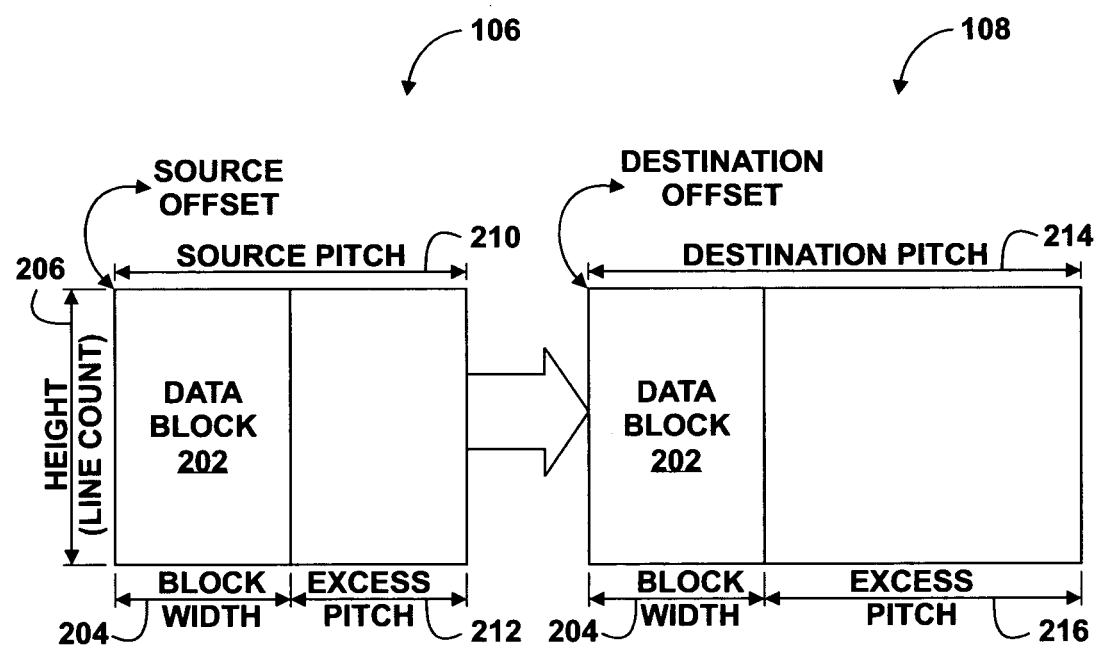
FIG. 2 is a diagram illustrating a transfer of a data block from a source storage component to a destination storage component in accordance with at least one embodiment of the present disclosure.

Referring to FIG. 2, an exemplary data block transfer process is illustrated in accordance with at least one embodiment of the present disclosure. For a variety of reasons, image data in memory often is organized into a matrix of tiles or blocks, each block representing, for example, a macroblock or a supermacroblock of an image. Thus, each block has a block width based on the pixel width of the macroblock or supermacroblock and the number of bits per pixel (often referred to as the pixel depth). However, the memory lines of memory used to store the image data often have a pitch (or width) different than the block width, resulting in excess capacity in each line that typically stores null data or data for another data block. To illustrate, the block 202 of FIG. 2 that is transferred between the system memory 106 to the video memory 108 has a block width 204 and a block height 206 (e.g., the number of lines of memory used to store the block), whereas the memory 106 has a pitch 210 greater than the block width 204, resulting in excess pitch 212 for each memory line. Likewise, the video memory 108 has a pitch 214 larger than the block width 204, resulting in excess pitch 216 for each line of the video memory 108. Moreover, in many instances the pitch of the source memory (e.g., pitch 210 of memory 106) may differ from the pitch of the destination memory (e.g., pitch 214 of memory 108).

It will be appreciated that in many instances the excess pitch 216 of each line of the memory 108 may store useful data. Accordingly, rather than transferring all of the data stored at each line of the memory 106 to the corresponding line of the memory 108 and thereby overwriting the useful data stored in the excess pitch 216 of each line, the CPU 102 (FIG. 1), in one embodiment, transfers only the data portion of each line of the memory 106 corresponding to the block width 204 to the portion of the corresponding line of the memory 108 and avoids transferring the data stored in the excess pitch 212 of each line to the corresponding line of the memory 108. In at least one embodiment, the values associated with the strided block transfer instruction are utilized by the CPU 102 to identify when it has reached the end of the block width 204 for a particular line of the memory 106 and to identify the starting position of the data portion of the next line.

Figure 3:
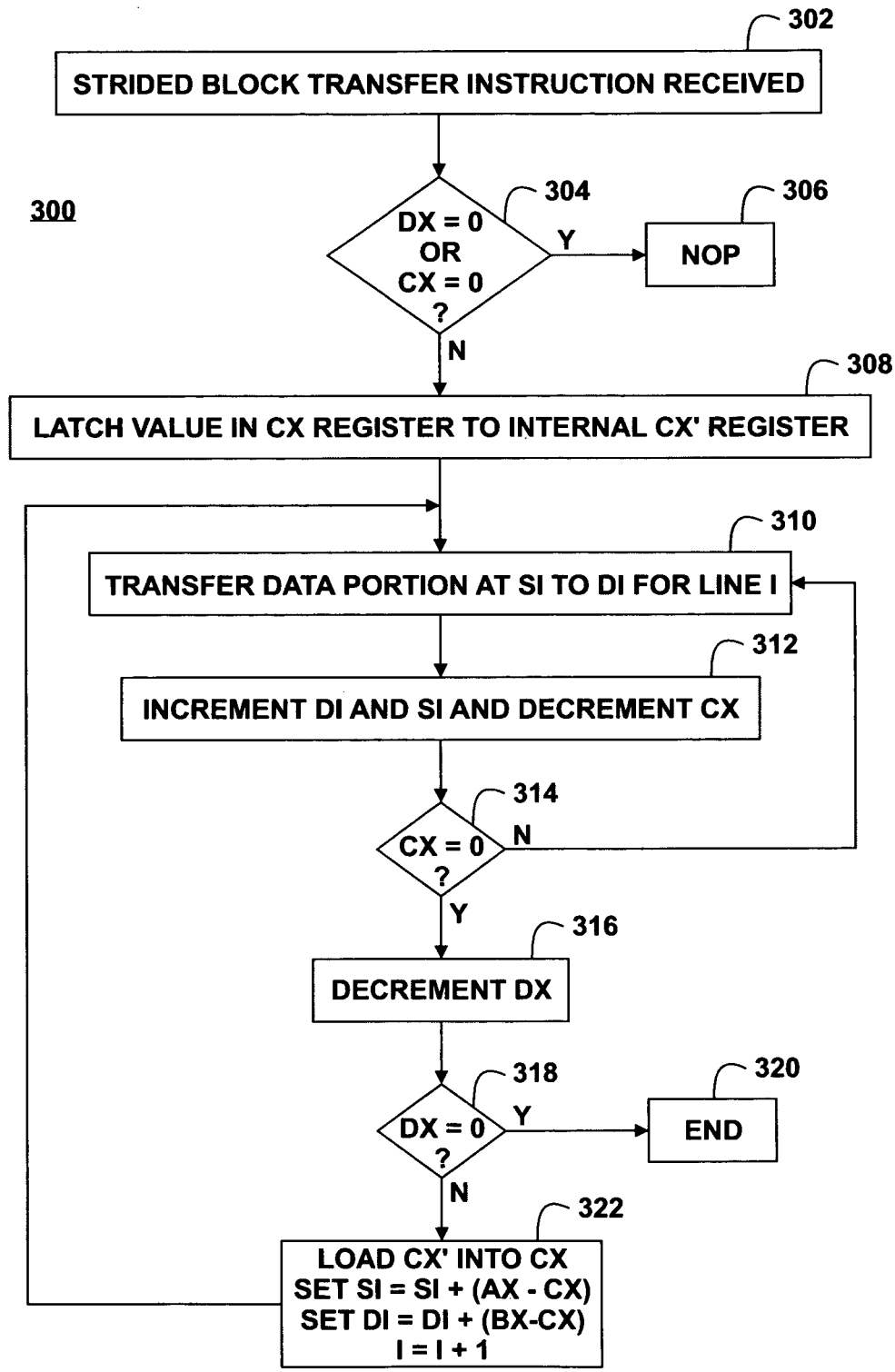
FIG. 3 is a flow diagram illustrating an execution of a strided block transfer instruction at an execution pipeline of a processing system in accordance with at least one embodiment of the present disclosure.

Referring to FIG. 3, an exemplary method 300 implemented by the CPU 102 (FIG. 1) to execute a strided block transfer instruction is illustrated in accordance with at least one embodiment of the present disclosure. The method 300 includes receiving a strided block transfer instruction at an execution pipeline of a processing unit at block 302. The strided block transfer instruction includes or otherwise identifies a number of values used in executing the instruction. For ease of illustration, these values are identified by being stored in a set of registers utilized by the execution pipeline when executing the instruction, the registers including a SI register storing a source memory location value, a DI register storing a destination memory location value, a CX register storing a byte number value, a DX register storing a line number value, an AX register storing a source pitch value, and a BX register storing a destination pitch value, as described above with reference to FIG. 1. Constants or other means of identifying the values also can be implemented using the guidelines provided herein without departing from the scope of the present disclosure.

At block 304, the execution pipeline determines whether the line number value (stored in the DX register) or the byte number value (stored in the CX register) is equal to zero (or less than or equal to zero in a signed numbers implementation). If either of these values are zero, the indicated size of the data block to be transferred would be zero bytes and therefore in error. Accordingly, at block 306 the execution pipeline would identify the instruction as a non-operation (NOP) and implement fault handling procedure accordingly.

Otherwise, if both the line number value and the byte number value are greater than zero, the identified data block to be transferred is at least one byte and flow therefore continues to block 308 whereby the execution pipeline latches the original byte number value (stored in the CX register) into a register internal to the CPU (e.g., CX' register 134, FIG. 1). The original byte number value is copied because, as discussed below, the execution pipeline modifies the value stored in the CX register as the instruction is processed.

At block 310, the execution pipeline transfers a data portion of the data block to be transferred from line i (where i=0 for the first iteration of block 310 and is incremented for each iteration), where the data portion is stored at the source memory location identified by the source memory location value in the SI register and transferred to the destination memory location identified by the destination memory location value in the DI register. As noted above, the source and destination memory location values are initialized to point to the first memory location of the first lines of the source storage component and the destination storage component that store, and will store, respectively, the block data to be transferred. The size of the data portion transferred may be determined based on values of global variables stored in memory, parameters passed with a function call, and the like.

Further, in at least one embodiment, the execution pipeline may perform a logic operation on the transferred data portion. To illustrate, in one embodiment, the strided block transfer instruction may identify an invert option whereby bit values of the transferred data portion are XORed with a predetermined value (provided as either a constant, or as a value stored in an identified register) prior to being stored at the destination storage component. To illustrate, the bit values of the transferred data portion can be inverted (e.g., for monochrome displays) by XORing the transferred data portion with a value 0xFFFFFFFF and storing the resulting value at the destination memory location. In another embodiment, the transferred data portion is logically combined with the destination data rather than simply overwriting the destination data. This logical operation can be achieved by ANDing, ORing, or XORing the transferred data and the destination data. As another option, the strided block transfer instruction can be used to fill a destination block with a predetermined value rather than transferred data. Further, the logic operation can include a mathematical operation, such as an alpha blend performed on the transferred data portion and the destination data, or a data size conversion, such as a conversion from sixteen bits to thirty-two bits.

Upon transferring the data portion and/or performing the indicated logic operation (if any), the execution pipeline determines the next source memory location and destination memory location by incrementing the values stored at the SI register and DI register, respectively, based on the size of the data portion transferred at block 310. Likewise, because a portion of the data block at the identified line has been transferred, the byte number value stored at the CX register is decremented by the number of bytes in the transferred data portion at block 312.

At block 314, the execution pipeline determines whether all of the data for a line of the data block has been transferred by determining whether the value stored at the CX register is equal to zero. If the value is greater than zero, process represented by blocks 310-314 is repeated. Otherwise, if the value is equal to zero, all of the data for the data block at line i has been transferred, so at block 316 the execution pipeline decrements the line number value stored at the DX register by one to reflect that the transfer of a line of the data block has been achieved. At block 318, the execution pipeline determines whether all of the lines of the data block have been transferred by determining whether the value stored at the DX register is equal to zero. If so, the transfer of the data block is complete and the flow ends at block 320. Otherwise, the execution pipeline prepares to transfer the next line i+1 of the data block by replenishing the byte number value via a loading of the original byte number value stored in the CX' register into the CX register. Further, the execution pipeline determines the starting memory location of the next line at the source storage component by adding the difference between the values stored in the AX and the CX registers to the current value in the SI register so as to increment the current source memory location value by the width of the source storage component (i.e., SI=SI+(AX−CX)). Similarly, the execution pipeline determines the starting memory location of the next line at the destination storage component by adding the difference between the values stored in the BX and the CX registers to the current value in the DI register so as to increment the current destination memory location value by the width of the destination storage component (i.e., DI=DI+(BX−CX)). The flow then returns to block 310, whereupon the process represented by blocks 310-322 can be repeated for each subsequent line of the data block to be transferred until all lines are transferred, thereby completing execution of the strided block transfer instruction.

Figure 4:
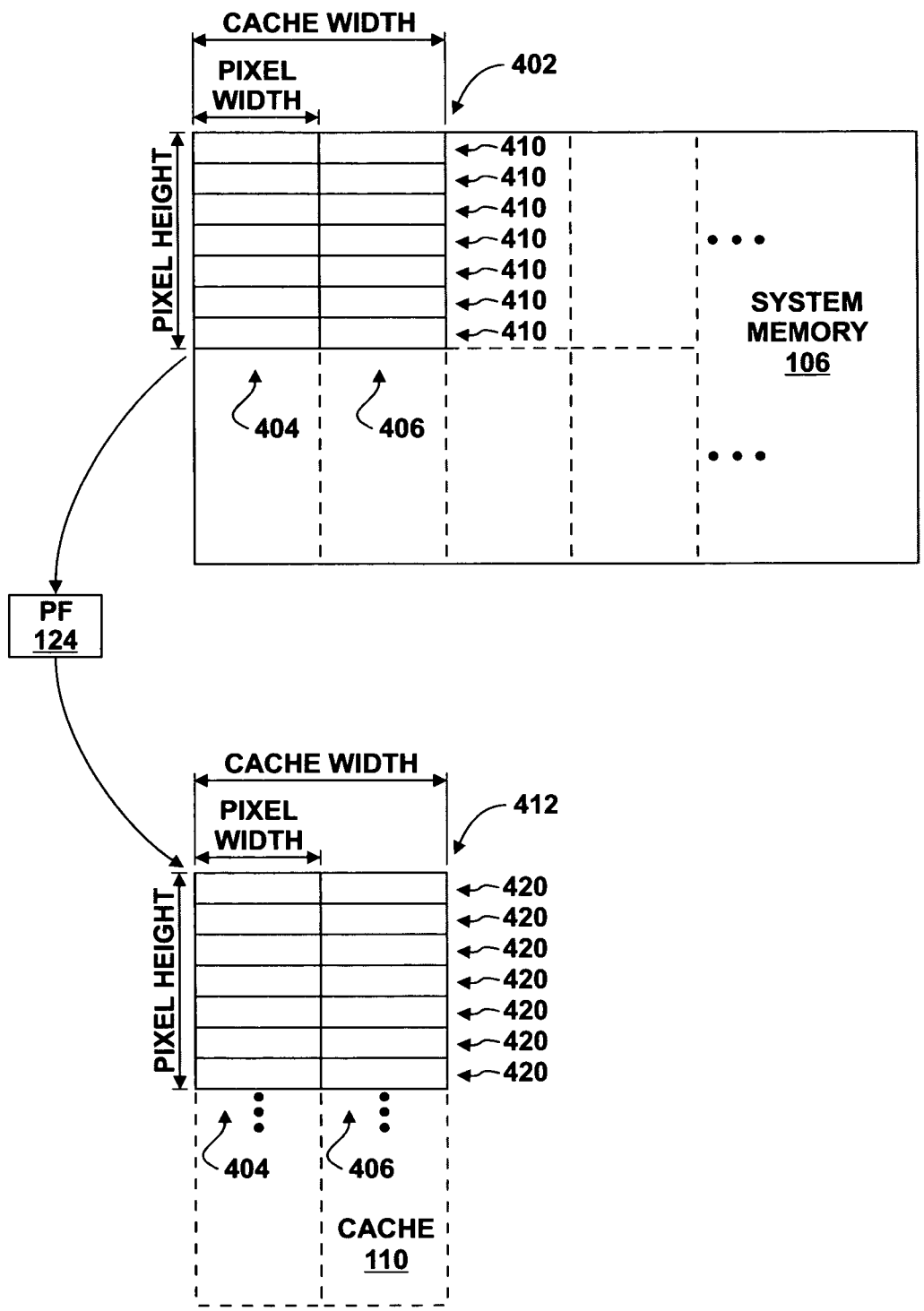
FIG. 4 is a diagram illustrating a transfer of a data block from memory to a cache in accordance with at least one embodiment of the present disclosure.

Referring to FIG. 4, an exemplary process for transferring a data block from a storage component to a cache is illustrated in accordance with at least one embodiment of the present disclosure. As discussed above, in one embodiment, the prefetch unit 124 of the execution pipeline 120 of the CPU 102 (FIG. 1) can implement a rectangular block transfer of data from a storage component, such as system memory 106, to a cache, such as cache 110, to facilitate graphics processing by graphics hardware, such as the GPU 104 (FIG. 1). As also discussed above, image data typically is organized in memory 106 as a matrix of blocks, such as macroblocks 404 and 406. Each of the macroblocks has a pixel height representing the number of rows of pixels and a pixel width representing the number of columns of pixels, typical row/widths of macroblocks include 4×4, 8×8 and 16×16 blocks of pixels. Accordingly, in at least one embodiment, the prefetch unit 124 prefetches a data block 402 from the system memory 106 by accessing each of the memory lines 410 and transferring the stored data to a corresponding line 420 of the cache 110 to form a corresponding data block 412 in the cache 110. However, in certain instances, the cache width of the cache 110 may be wider than the amount of data for each row of a single macroblock. To illustrate, for a pixel depth of one byte, a 16×16 macroblock requires only sixteen bytes per line, so a cache having a thirty-two byte cache width is capable of storing the data for two macroblocks for a given line height/pixel height.

Figure 5:
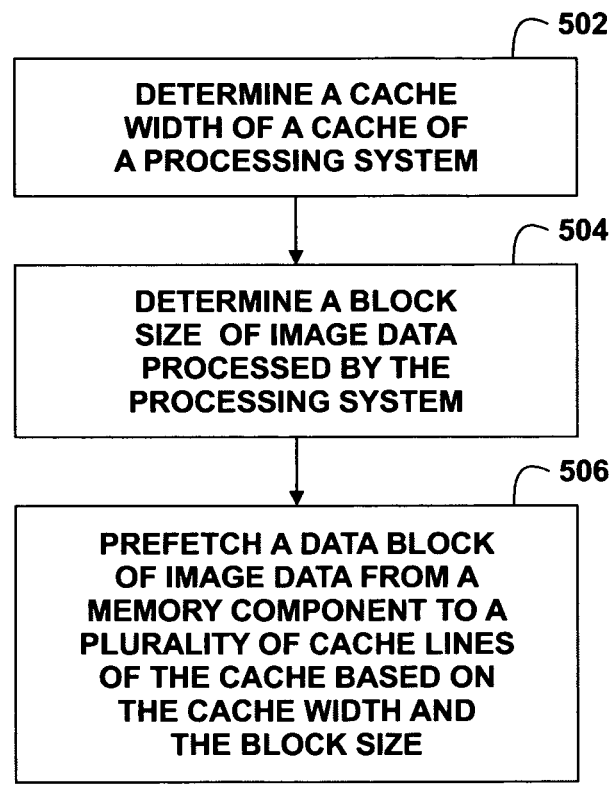
FIG. 5 is a flow diagram illustrating a method of transferring a data block from memory to a cache in accordance with at least one embodiment of the present disclosure.

Referring to FIG. 5, an exemplary method 500 for prefetching a data block from a storage component to a cache of a processing system is illustrated in accordance with at least one embodiment of the present disclosure. The method 500 includes determining a cache width of the cache at block 502. The cache width may be determined based on a configuration setting or via a value stored in a register. At block 504, the method 500 includes determining a block size of image data processed by the processing system. In one embodiment, the block size corresponds to a macroblock size and therefore can be determined based on configuration information included with the image data. At block 506, the method 500 includes prefetching a data block of image data from the storage component to a plurality of cache lines of the cache based on the cache width and the block size. In one embodiment, the number of cache lines used to store the data block is equal to a pixel height of the block size, where the pixel height is programmable and accessible via a programmable register storing a value representative of the pixel height.

In one embodiment, the data block is prefetched at block 506 by accessing a data portion of data stored at a corresponding line of the storage component and storing the data portion to a corresponding lien of the cache for each line of the data block. This transfer can be represented by the following pseudocode:

```
for (i=0; i<height; i++){
    rect_prefetch a[i*height];
}
``` where height represents the pixel height (2, 4, 6, 8, ... ), a is a base pointer, and rect_prefetch prefetches a data portion of a predetermined size (e.g., thirty-two bytes) from memory at the location a[i*height] to the cache.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
receiving, at an execution pipeline of a processing system, a block data transfer instruction;
determining, in response to receiving the block data transfer instruction, a first value representative of a source memory location of a source storage component, a second value representative of a destination memory location of a destination storage component, a third value representative of a number of lines of a data block to be transferred from the source storage component to the destination storage component, a fourth value representative of a number of bytes to be transferred per line of the data block, a fifth value representative of a byte width of the source storage component and a sixth value representative of a byte width of the destination storage component; and
executing, at the execution pipeline, the block data transfer instruction to transfer the data block from the source storage component to the destination storage component based on the first, second, third, fourth, fifth and sixth values.

2. The method of claim 1, wherein:
the first value is stored in a first register;
the second value is stored in a second register;
the third value is stored in a third register;
the fourth value is stored in a fourth register;
the fifth value is stored in a fifth register; and
the sixth value is stored in a sixth register.

3. The method of claim 2, wherein determining the first, second, third, fourth, fifth and sixth values comprises accessing the first, second, third, fourth, fifth and sixth registers.

4. The method of claim 1, wherein executing the block data transfer instruction comprises:
for each line of the source storage component storing data for the data block:
transferring a data portion at a memory location of the line represented by the first value to a memory location of a corresponding line of the destination storage component represented by the second value;
decrementing the fourth value based on a number of bytes represented by the data portion;
incrementing the first and second values based on the number of bytes represented by the data portion;
repeating the process of transferring, decrementing and incrementing until the fourth value is equal to zero; and
once the fourth value is zero:
decrementing the third value;
modifying the first value based on the fifth value; and
modifying the second value based on the sixth value.

5. The method of claim 1, wherein executing the block transfer instruction further includes performing a logic operation on at least a portion of the data block.

6. The method of claim 5, wherein the logic operation comprises inverting bit values of the data block for storage at the destination storage component.

7. The method of claim 5, wherein the logic operation comprises at least one of a logic combination of the data block with source data, a logic OR operation, a logic AND operation, a logic XOR operation or an alpha blend operation.

8. A processing system comprising:
a first storage component;
a second storage component;
a processing unit coupled to the first and second storage components, the processing unit comprising an execution pipeline to:
receive a block data transfer instruction;
determine, in response to receiving the block data transfer instruction, a first value representative of a source memory location of a first storage component, a second value representative of a destination memory location of a second storage component, a third value representative of a number of lines of a data block to be transferred from the first storage component to the second storage component, a fourth value representative of a number of bytes to be transferred per line of the data block, a fifth value representative of a byte width of the first storage component and a sixth value representative of a byte width of the second storage component; and
execute the block data transfer instruction to transfer the data block from the first storage component to the second storage component based on the first, second, third, fourth, fifth and sixth values.

9. The processing system of claim 8, further comprising:
a first register to store the first value;
a second register to store the second value;
a third register to store the third value;
a fourth register to store the fourth value;
a fifth register to store the fifth value; and
a sixth register to store the sixth value.

10. The processing system of claim 9, wherein the execution pipeline determines the first, second, third, fourth, fifth and sixth values by accessing the first, second, third, fourth, fifth and sixth registers.

11. The processing system of claim 8, wherein the execution pipeline executes the block data transfer instruction by:
for each line of the first storage component storing data for the data block:
transferring a data portion at a memory location of the line represented by the first value to a memory location of a corresponding line of the second storage component represented by the second value;
decrementing the fourth value based on a number of bytes represented by the data portion;
incrementing the first and second values based on the number of bytes represented by the data portion; and
repeating the process of transferring, decrementing and incrementing until the fourth value is equal to zero; and
once the fourth value is zero:
decrementing the third value;
modifying the first value based on the fifth value; and
modifying the second value based on the sixth value.

12. The processing system of claim 8, wherein the execution pipeline further is to perform a logic operation on at least a portion of the data block.

13. The processing system of claim 12, wherein the logic operation comprises inverting bit values of the data block for storage at the second storage component.

14. The processing system of claim 12, wherein the logic operation comprises a logic combination of the data block with source data.

15. The processing system of claim 12, wherein the logic combination comprises at least one of a logic OR operation, a logic AND operation or a logic XOR operation.

16. The processing system of claim 8, wherein the first storage component comprises system memory and the second storage component comprises a video memory.

17. The processing system of claim 8, wherein the data block is representative of a portion of an image.

18. A non-transitory computer readable medium embodying a set of executable instructions, the set of executable instructions comprising an executable instruction to manipulate a processor to:
determine a first value representative of a source memory location of a source storage component, a second value representative of a destination memory location of a destination storage component, a third value representative of a number of lines of a data block to be transferred from the source storage component to the destination storage component, a fourth value representative of a number of bytes to be transferred per line of the data block, a fifth value representative of a byte width of the source storage component and a sixth value representative of a byte width of the destination storage component; and
transfer a data block from the source storage component to the destination storage component based on the first, second, third, fourth, fifth and sixth values.

19. The computer readable medium of claim 18, wherein the processor determines the first, second, third, fourth, fifth and sixth values by accessing the first, second, third, fourth, fifth and sixth registers.

20. The computer readable medium of claim 18, wherein the executable instruction manipulates the processor to transfer the data block by:
for each line of the source storage component storing data for the data block:
manipulating the processor to transfer a data portion at a memory location of the line represented by the first value to a memory location of a corresponding line of the destination storage component represented by the second value;
manipulating the processor to decrement the fourth value based on a number of bytes represented by the data portion;
manipulating the processor to increment the first and second values based on the number of bytes represented by the data portion; and
manipulating the processor to repeat the process of transferring, decrementing and incrementing until the fourth value is equal to zero; and
once the fourth value is zero:
manipulating the processor to decrement the third value;
manipulating the processor to modify the first value based on the fifth value; and
manipulating the processor to modify the second value based on the sixth value.

* * * * *